Sept. 4, 1951
RENE LUCIEN LEVY
ALSO KNOWN AS
RENE LUCIEN
LIQUID COMPRESSION SHOCK ABSORBER
Filed May 26, 1948
2,566,736
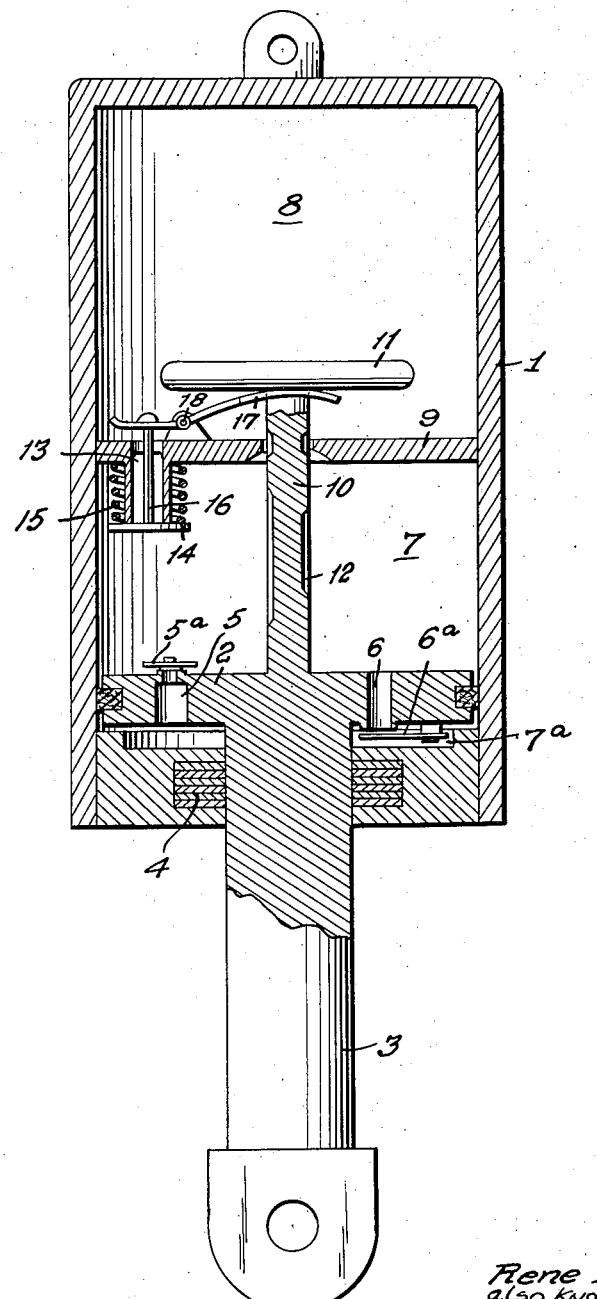
INVENTOR.
Rene L. Levy
also known as
BY Rene Lucien
Attorneys.

Patented Sept. 4, 1951

2,566,736

UNITED STATES PATENT OFFICE 2,566,736

LIQUID COMPRESSION SHOCK ABSORBER

René Lucien Levy, also known as René Lucien, Paris, France, assignor to Societe d'Inventions Aeronautiques et Mecaniques S. I. A. M., Geneva, Switzerland, a corporation of Switzerland Application May 26, 1948, Serial No. 29,248
In France June 5, 1947

3 Claims. (Cl. 267—64)

1

The liquid-compression shock absorbers hitherto known and employed generally have the disadvantage of a constant adjustment of the orifices over the entire length of their stroke.

One of the objects of the present invention is to provide a shock absorber in which the cross-sectional areas for the passage of the liquid can vary under compression in dependence upon the degree of penetration of the piston into the cylinder so as to produce an optimum output.

A further object of the invention is to provide the said shock absorber, if desired, with a device such that the adjustment used during taxiing is different from that used at the moment of impact.

A shock absorber provided with the improvements according to the invention is illustrated diagrammatically in the single figure of the accompanying drawing, which is a longitudinal sectional view along the axis of the shock absorber.

In this figure, 1 is the cylinder of the shock absorber, 2 the piston, 3 the rod, and 4 the packing. Formed in the body of the piston are two channels, one of which, 5 has a narrow orifice and the other, 6, has a relatively large sectional area, while both the said orifices are provided with suitable valves 5a and 6a respectively.

The interior of the cylinder 1 is divided into two chambers 7 and 8 by a diaphragm 9, and the rod 3 is extended by a counter-rod 10 extending through the diaphragm 9 and terminated by a plate 11. Formed in the external wall of the counter-rod 10 are longitudinal grooves 12.

An orifice 13 is formed in the diaphragm 9 for communication between the chambers 7 and 8. Mounted over this orifice is a valve 14 which tends to be maintained in the open position by a spiral spring 15, but the rod 16 of which is, on the other hand, urged by a resilient fork 17 pivotally connected at 18 to the diaphragm and applied against the lower face of the plate 11. In the position shown in the figure, the piston 2 has reached the end of its down-stroke and the valve 14 is held closed against the action of the spring 15 by the force exerted by the plate 11, through the resilient fork 17, the tension of which is greater than that which would be necessary to maintain the valve 14 in the closed position by counter-balancing the compression of the spring 15.

The device operates in the following manner:

At the time of landing (position shown in the figure) the valve 14 is closed. Upon compression, the liquid contained in the chamber 7 passes partly into the chamber 7a, but without any great force because the orifice 6 is relatively large, while the quantity of liquid corresponding to the difference in volume between the rod 3 and the counter-rod 10 must pass through the

2 gap between the said counter-rod and the diaphragm 9. The grooves 12 in the counter-rod render possible a strong braking action for the purpose of producing maximum output.

At the beginning of the penetration of the piston, the valve 14 is maintained in position, that is to say closed, in spite of the fact that the plate 11 has moved several milimetres owing to the initial tension of the fork 17, to which it is subjected during the extension of the shock absorber.

It is thus certain—and it is in this respect that the present arrangement differs from the known arrangements—that the pressure created by the braking action following the shock has had sufficient time to become established in the chamber 7 and to produce by itself the closing of the valve 14 against the action of the spring 15.

After the first shock, when the shock absorber has undergone even a slight extension, the pressure in the chamber 7 falls to a value equal to that obtaining in the chamber 8. At this moment, the valve 14, urged by the spring 15, opens by a sufficient amount to prevent it from being re-closed spontaneously.

From this time, the shock absorber is capable of functioning in a second phase, in which the counter-rod 10 no longer has any function, the braking being effected upon extension by the narrow orifice of the channel 5 and upon compression by the valve orifice 6—6a.

Now, although the passage of liquid through the narrow orifice of the channel 5 produces a braking action proportional to the square of the speed in the same way as the braking action which is produced between the diaphragm 9 and the grooves 12, it is found on the other hand that the braking action under compression, during taxiing, is caused by the passage of the liquid at 6 through a relatively wide orifice, with the loss of head due to the flexible blade 6a of relatively large surface. It is known that in this case the braking action is proportional to the speed and consequently it corresponds to the requirements for providing good taxiing characteristics.

When the aircraft takes off, the plate 11 acts on the resilient fork 17, which becomes deformed and assumes a tension greater than that which would be required to maintain the valve 14 closed, as has hereinbefore been explained, whereby good operation at the beginning of the following landing is ensured.

The device hereinbefore described, which provides a modification in the adjustment of the shock absorber, is applicable to all shock absorber tubes and in particular to oleo-pneumatic shock absorbers.

It is to be noted that the variation of braking along the stroke could result from the use of grooves formed in the inner wall of the principal cylinder 1. However, this device would not allow the piston 2 to be provided with a packing and difficulties in adjustment would thus arise owing to the leakages which would occur over such a large diameter.

It is therefore clear that I have provided a liquid spring shock absorber operable in phases. The first phase occurring during the landing impact in which the valve 14 is closed by the elastic force exerted on the rod 16 by the resilient reacting means 17 reacting against the lower face of the abutment or platform 11. A small braking action is exerted between chamber 7a and 7 through the large orifice 6. A powerful braking action is exerted between the chambers 7 and 8 by the cooperation between the grooves 12 on the counter-rod 10 with the aperture in the diaphragm 9 through which the counter-rod passes. In the second phase after the landing impact when the aircraft is taxiing the same pressure exists in both chambers 7 and 8, the valve 14 opens due to the action of spring 15 since the abutment or plate 11 has risen. This valve is positively held open. The braking of the liquid is exerted through orifices 5 and 6 between chambers 7 and 7a and this braking is a differential braking in accordance with the compression or operation stroke. Therefore, in my arrangement the valve 14 does not act as a brake and is utilized to momentarily close free communication between chambers 7 and 8, then to provide communication on suppressing, consequently the braking effect established by the counter-rod 10.

What I claim is:

1. A liquid spring shock absorber comprising a cylinder, a piston moving lightly in said cylinder, a piston rod carrying said piston and extending from one side thereof, an apertured diaphragm within said cylinder and dividing the same into two chambers, said diaphragm being disposed in the cylinder on the side of the piston opposite to said rod, said piston having orifices therein of different cross sectional area and said orifices passing through said piston to provide for fluid passage to and from opposite sides of the piston, valves for said orifices arranged respectively on opposite sides of the piston of the valves, the orifice of smaller cross-sectional area being arranged on the side of the piston adjacent said diaphragm, a counter-rod extending from the piston on the side thereof opposite to said piston rod and passing through the aperture in said diaphragm with a small clearance, said counter-rod having longitudinal grooves therein cooperable with the aperture in said diaphragm to provide a strong braking action upon compression of liquid between said piston and said diaphragm, said diaphragm further having a channel providing communication between opposite sides thereof, a normally opened spring pressed valve mounted between the diaphragm and the piston, a valve rod for said valve, abutment means carried at the free end of said counter-rod and reactive means reacting against said abutment means and exerting on said valve rod a force opposed to the spring pressure tending to normally open the said valve, said reactive means closing said valve when the shock absorber is at rest.

2. A liquid spring shock absorber comprising a cylinder, a piston moving lightly in said cylinder, a piston rod carrying said piston and extending from one side thereof, an apertured diaphragm within said cylinder and dividing the same into two chambers, said diaphragm being disposed in the cylinder on the side of the piston opposite to said rod, said piston having orifices therein of different cross sectional area and said orifices passing through said piston to provide for fluid passage to and from opposite sides of the piston, valves for said orifices arranged respectively on opposite sides of the piston of the valves, the orifices of smaller cross-sectional area being arranged on the side of the piston adjacent said diaphragm, a counter-rod extending from the piston on the side thereof opposite to said piston rod and passing through the aperture in said diaphragm with a small clearance, said counter-rod having longitudinal grooves therein cooperable with the aperture in said diaphragm to provide a strong braking action upon compression of liquid between said piston and said diaphragm, said diaphragm further having a channel providing communication between opposite sides thereof, a normally opened spring pressed valve mounted between the diaphragm and the piston, a valve rod for said valve, abutment means carried at the free end of said counter-rod and resilient reactive means reacting against said abutment means and exerting on said valve rod a resilient froce opposed to the spring pressure tending to normally open the said valve, said resilient reactive means closing said valve when the shock absorber is at rest.

3. A liquid spring shock absorber comprising a cylinder, a piston movable lightly in said cylinder, a piston rod extending from one side of and carrying said piston, an apertured diaphragm dividing said cylinder into two chambers and located at the opposite end of the piston rod, said piston having orifices passing therethrough, a valve for one orifice arranged on the side of the piston opposite to the diaphragm, a valve for the other orifice, of smaller cross section arranged on the side of the piston adjacent said diaphragm, a counter rod arranged on the piston on the opposite side of said piston rod and passing through the aperture in said diaphragm with a small clearance, said counter rod having longitudinal grooves therein, said diaphragm further having a channel therein between the chambers arranged on either side of said diaphragm, a valve located in front of said channel and mounted in the chamber in which the piston moves, a valve rod for said last mentioned valve, a spring constantly tending to open said last mentioned valve, an abutment at the one end of the counter rod and a resilient fork interposed between said abutment and said valve rod, to exert, in the position of the shock absorber at the end of the extension stroke, on the last mentioned valve, in the direction of its closing, an effort greater than the antagonistic effort exerted by the spring of the last mentioned valve.

RENÉ LUCIEN LEVY,
*Also known as René Lucien.*

REFERENCES CITED

The following references are of record in the file of this patent:

UNITED STATES PATENTS

| Number | Name | Date |
| --- | --- | --- |
| 2,098,398 | Mercier | Nov. 9, 1937 |
| 2,366,248 | Focht | Jan. 2, 1945 |

FOREIGN PATENTS

| Number | Country | Date |
| --- | --- | --- |
| 751,475 | France | Sept. 4, 1933 |